(12) United States Patent
Barton et al.

(10) Patent No.: US 11,944,516 B2
(45) Date of Patent: Apr. 2, 2024

(54) THREE-DIMENSIONAL STABILIZATION THREAD FORM FOR DENTAL IMPLANTS

(71) Applicant: EVOLLUTION IP HOLDINGS, INC., Birmingham, AL (US)

(72) Inventors: Patrick E. Barton, Birmingham, AL (US); John J. Bellanca, Birmingham, AL (US); Thomas P. Lewis, Birmingham, AL (US); Fred J. Molz, Birmingham, AL (US)

(73) Assignee: Evollution IP Holdings, Inc., Birmingham, AL (US)

( * ) Notice: Subject to any disclaimer, the term of this patent is extended or adjusted under 35 U.S.C. 154(b) by 0 days.

(21) Appl. No.: 17/845,581

(22) Filed: Jun. 21, 2022

(65) Prior Publication Data
US 2022/0313398 A1 Oct. 6, 2022

Related U.S. Application Data

(63) Continuation of application No. 16/157,530, filed on Oct. 11, 2018, now Pat. No. 11,382,724.

(60) Provisional application No. 62/570,890, filed on Oct. 11, 2017.

(51) Int. Cl.
*A61C 8/00* (2006.01)
(52) U.S. Cl.
CPC .......... *A61C 8/0025* (2013.01); *A61C 8/0022* (2013.01); *A61C 8/0037* (2013.01); *A61C 8/0024* (2013.01)
(58) Field of Classification Search
CPC ... A61C 8/0025; A61C 8/0022; A61C 8/0037; A61C 8/0024; A61C 8/0018; A61C 8/0069; A61C 8/0054; A61C 8/0074; A61C 8/0068; A61C 8/0071; A61C 8/0021; A61C 8/00; A61C 8/0045; F16B 33/02; F16B 39/30; F16B 25/00; A61B 17/863
USPC .............. 433/174–176, 201.1; 606/315
See application file for complete search history.

(56) References Cited

U.S. PATENT DOCUMENTS

| | | | |
|---|---|---|---|
| 2,788,045 A | 4/1957 | Rosan |
| 2,788,046 A | 4/1957 | Rosan |
| 3,487,442 A | 12/1969 | Rossmann |
| 4,023,914 A | 5/1977 | Holmes |

(Continued)

FOREIGN PATENT DOCUMENTS

| AU | 2008240942 A1 * 11/2009 | ........... A61C 8/0022 |
|---|---|---|
| WO | WO-03028579 A1 * 4/2003 | ......... A61B 17/8625 |

(Continued)

OTHER PUBLICATIONS

JP 2012521232 A—Bone anchor (Year: 2012).*

*Primary Examiner* — Ralph A Lewis
*Assistant Examiner* — Mirayda A Aponte
(74) *Attorney, Agent, or Firm* — Perilla Knox & Hildebrandt LLP

(57) ABSTRACT

An implant for insertion within a maxillofacial bone of a patient including a tapered body and one or more threads formed along the body. The one or more threads on one or more lead threads include multiple thread forms including both three-dimensional stabilization thread and standard thread (e.g. v-thread, buttress thread, etc.) forms. The one or more threads including the multiple thread forms provides for maximizing the restriction of lateral movement of the implant within a full or partial osteotomy.

7 Claims, 15 Drawing Sheets

(56) References Cited

U.S. PATENT DOCUMENTS

| | | | |
|---|---|---|---|
| 4,244,607 | A | 1/1981 | Blose |
| 4,600,224 | A | 7/1986 | Blose |
| 4,764,067 | A | 8/1988 | Kawashima |
| 4,810,149 | A | 3/1989 | Lee et al. |
| 4,850,775 | A | 7/1989 | Lee et al. |
| 4,861,210 | A | 8/1989 | Frerejacques |
| 5,433,606 | A | 7/1995 | Niznick et al. |
| 5,964,766 | A | 10/1999 | Shaw |
| 6,149,432 | A | 11/2000 | Shaw |
| 6,315,564 | B1 | 11/2001 | Levisman |
| 6,481,760 | B1 | 11/2002 | Noel et al. |
| 6,572,315 | B1 | 6/2003 | Reed |
| 6,722,833 | B2 | 4/2004 | Birkelbach |
| 6,767,035 | B2 | 7/2004 | Hashem |
| 7,281,925 | B2 | 10/2007 | Hall |
| 7,416,374 | B2 | 8/2008 | Breihan et al. |
| 8,016,593 | B2 | 9/2011 | Hall |
| 8,038,442 | B2 | 10/2011 | Hurson |
| 8,337,205 | B2 | 12/2012 | Reed |
| 8,545,572 | B2 | 10/2013 | Olson |
| 8,602,781 | B2 | 12/2013 | Reed |
| 8,636,808 | B2 | 1/2014 | Olson |
| 8,671,547 | B2 | 3/2014 | Matsubayashi et al. |
| 8,696,720 | B2 | 4/2014 | Lazarof |
| 8,870,928 | B2 | 10/2014 | Jackson |
| 8,875,399 | B2 | 11/2014 | Reed |
| 9,011,506 | B2 | 4/2015 | Wen |
| 9,055,985 | B2 | 6/2015 | Lazarof |
| 9,220,602 | B2 | 12/2015 | Olson |
| 9,452,031 | B2 | 9/2016 | Hurson |
| 9,681,930 | B2 | 6/2017 | Thome |
| 9,803,679 | B1 | 10/2017 | Eidinger |
| 9,901,379 | B2 | 2/2018 | Reed |
| 9,931,220 | B2 | 4/2018 | Olson |
| 10,036,413 | B2 | 7/2018 | Otten et al. |
| 10,064,707 | B2 | 9/2018 | Zadeh |
| 10,066,656 | B2 | 9/2018 | Reed |
| 10,085,782 | B2 | 10/2018 | Reed |
| 10,233,963 | B2 | 3/2019 | Eidinger |
| 10,441,385 | B2 | 10/2019 | Reed |
| 10,603,140 | B2 | 3/2020 | Hall |
| 10,709,524 | B2 | 7/2020 | Fromovich |
| 10,980,617 | B2 | 4/2021 | Valen |
| 11,076,901 | B2 | 8/2021 | Zastrozna |
| 11,266,453 | B2 | 3/2022 | Zastrozna |
| 2004/0121289 | A1* | 6/2004 | Miller ............... A61C 8/0022 433/174 |
| 2006/0009773 | A1 | 1/2006 | Jackson |
| 2008/0261176 | A1 | 10/2008 | Hurson |
| 2010/0261141 | A1 | 10/2010 | Ajlouni et al. |
| 2011/0081626 | A1 | 4/2011 | Hurson |
| 2012/0021381 | A1 | 1/2012 | Hurson |
| 2012/0058451 | A1 | 3/2012 | Lazarof |
| 2013/0011811 | A1 | 1/2013 | Gourlaouen-Preissler et al. |
| 2013/0022942 | A1 | 1/2013 | Zadeh |
| 2013/0224687 | A1 | 8/2013 | Karmon |
| 2013/0273500 | A1 | 10/2013 | Giorno |
| 2014/0023990 | A1 | 1/2014 | Zadeh |
| 2014/0329202 | A1* | 11/2014 | Zadeh ............... A61C 8/006 433/174 |
| 2017/0135788 | A1 | 5/2017 | Reed |
| 2019/0063482 | A1 | 2/2019 | Reed |
| 2019/0105131 | A1 | 4/2019 | Barton |
| 2020/0146786 | A1 | 5/2020 | Fromovich |
| 2020/0337811 | A1 | 10/2020 | Fromovich |
| 2021/0307800 | A1 | 10/2021 | Zastrozna |
| 2021/0338385 | A1 | 11/2021 | Fromovich |
| 2022/0151670 | A1 | 5/2022 | Hyer |
| 2022/0152715 | A1 | 5/2022 | Hyer |
| 2022/0249131 | A1 | 8/2022 | Hyer |
| 2022/0249147 | A1 | 8/2022 | White |
| 2022/0249148 | A1 | 8/2022 | Hyer |
| 2022/0265333 | A1 | 8/2022 | Fauth |

FOREIGN PATENT DOCUMENTS

| | | |
|---|---|---|
| WO | 200774498 | 7/2007 |
| WO | 2008128757 | 10/2008 |
| WO | 2009054005 | 4/2009 |
| WO | 2010021478 | 2/2010 |
| WO | 2021059300 | 4/2021 |

* cited by examiner

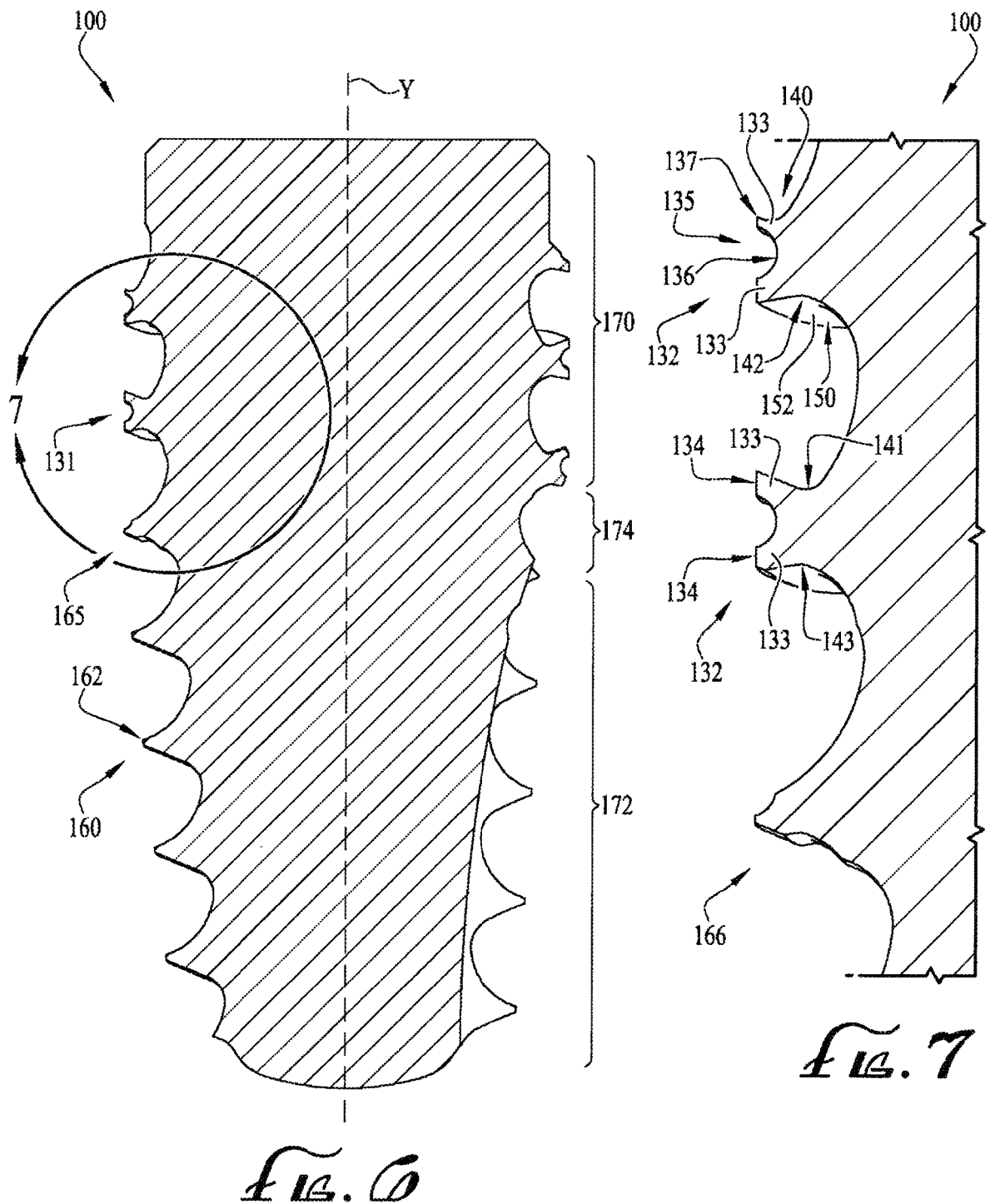

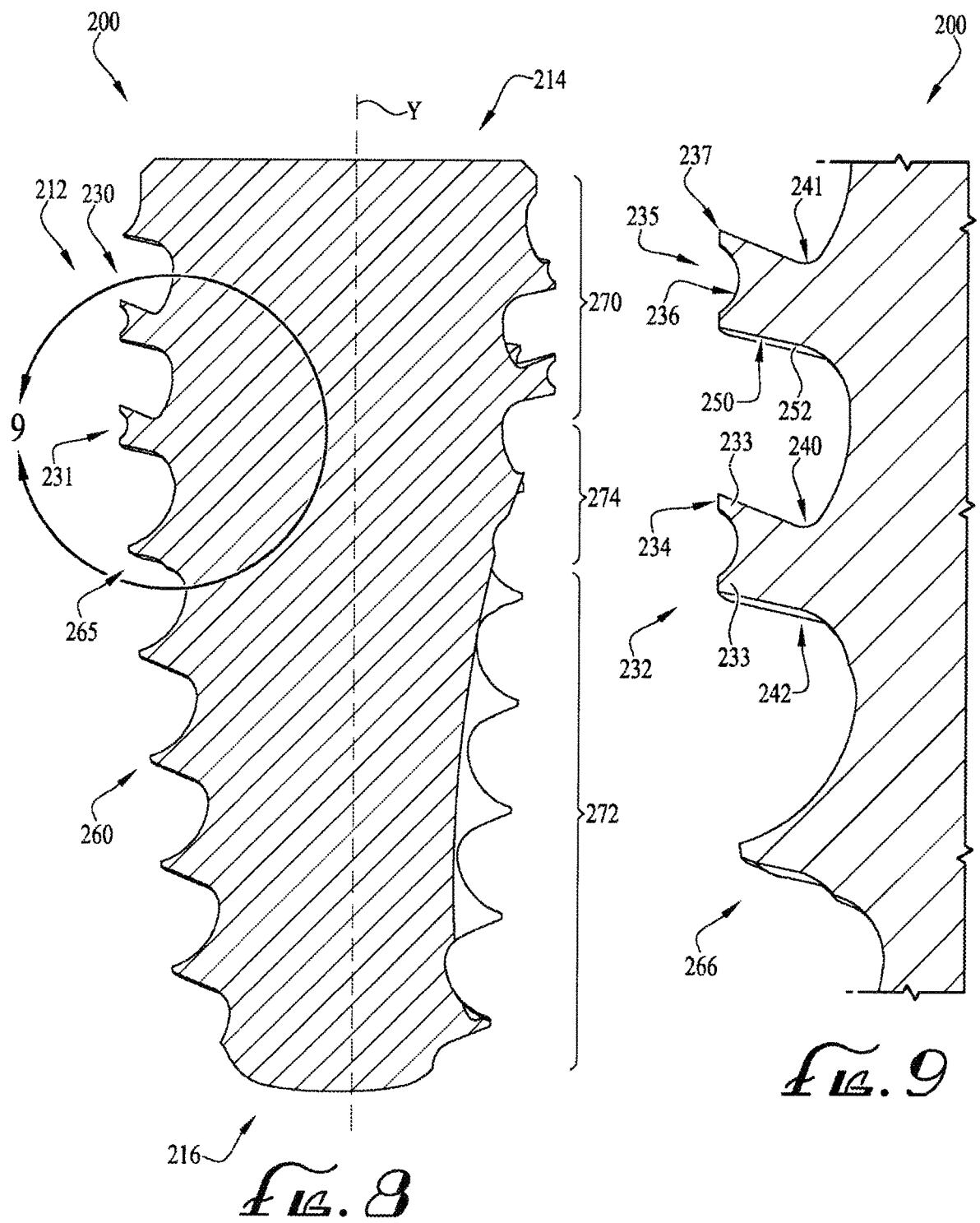

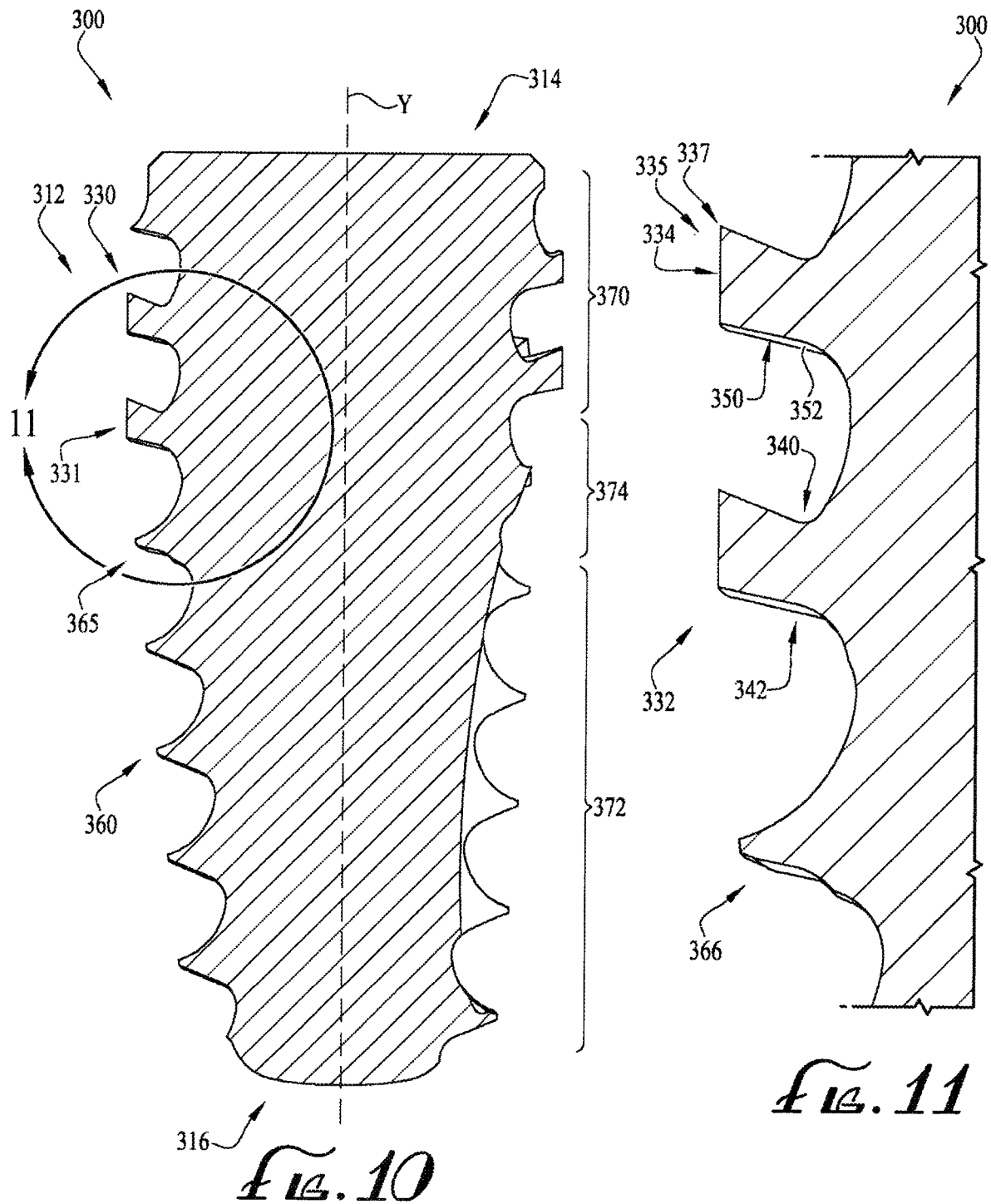

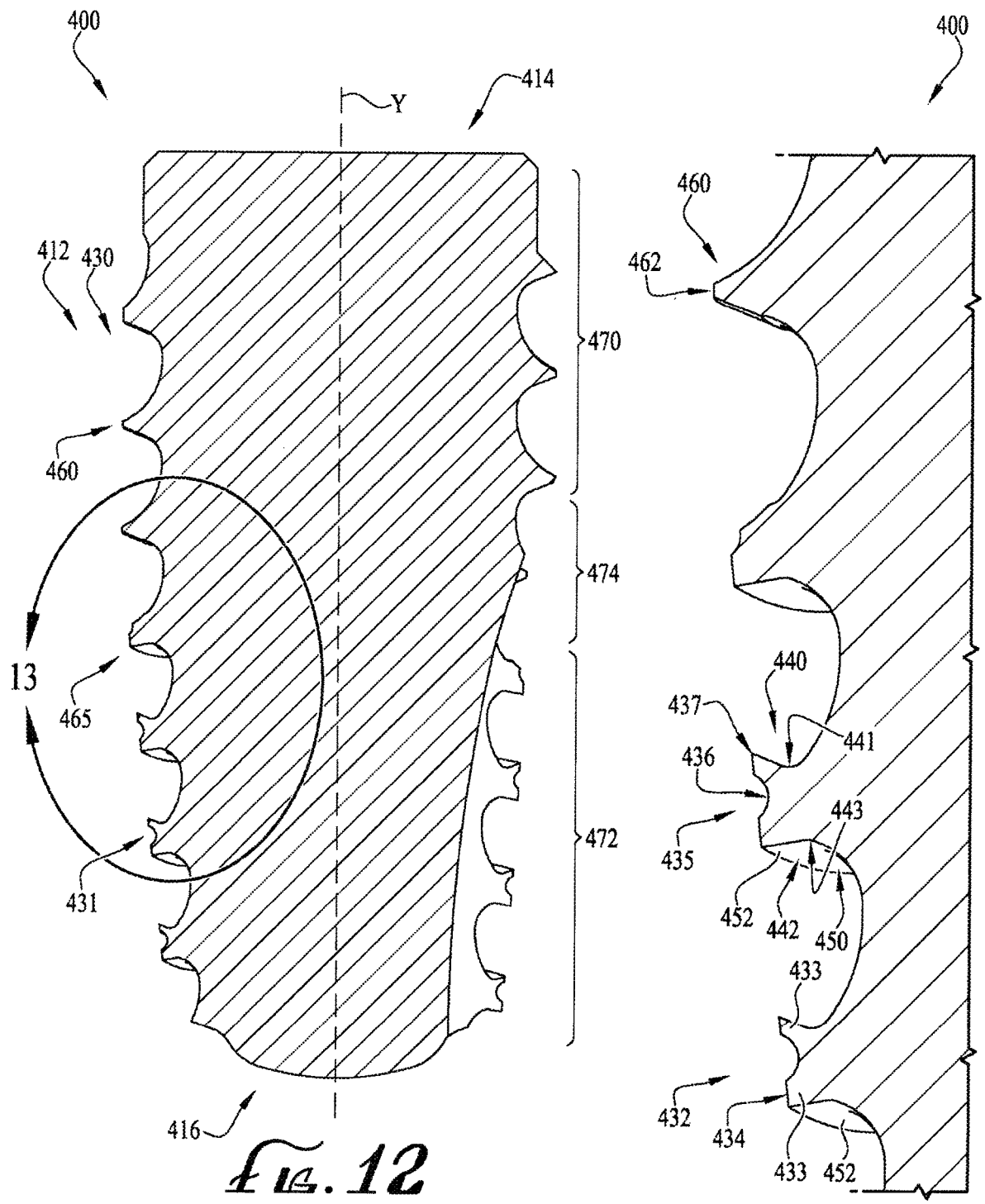

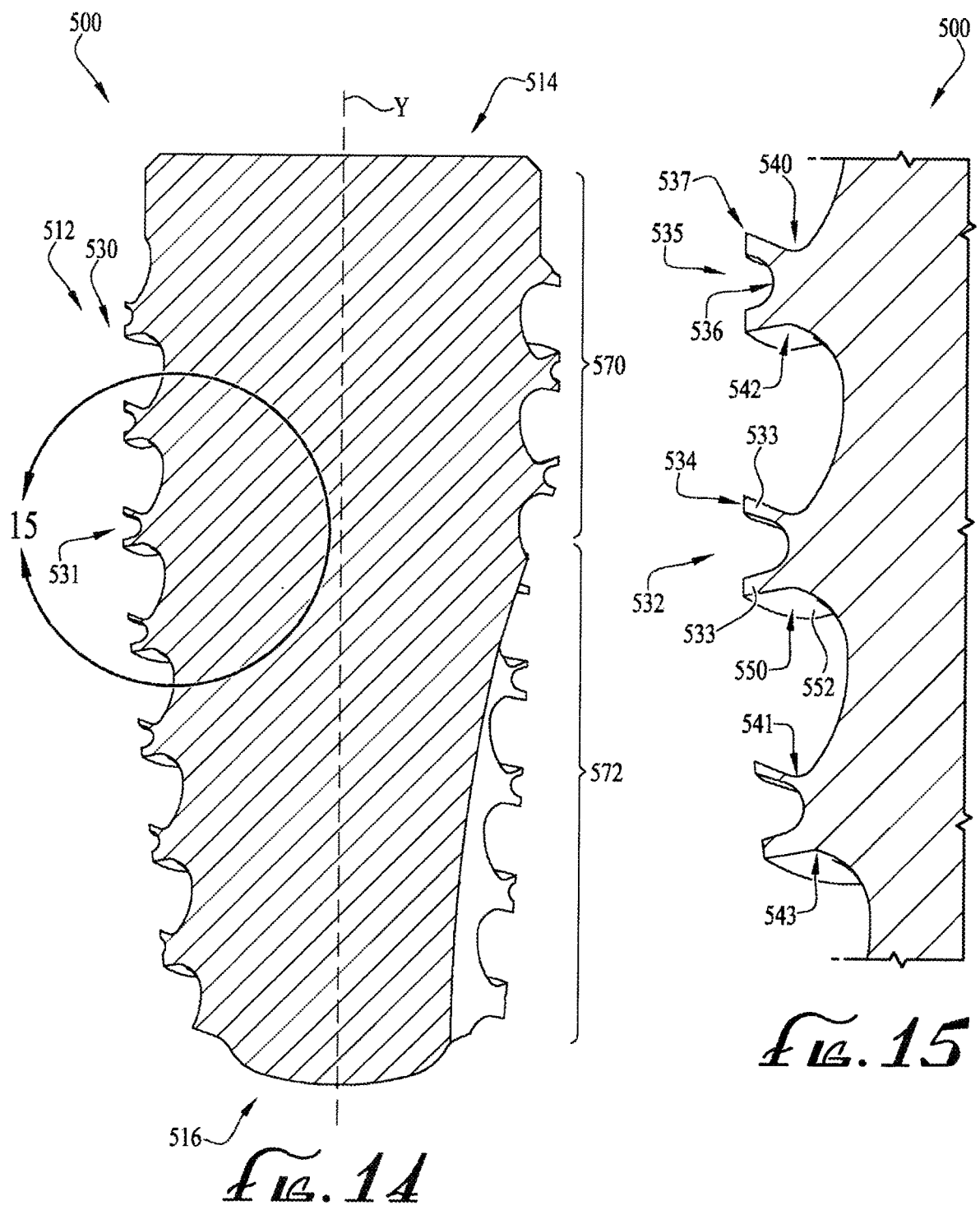

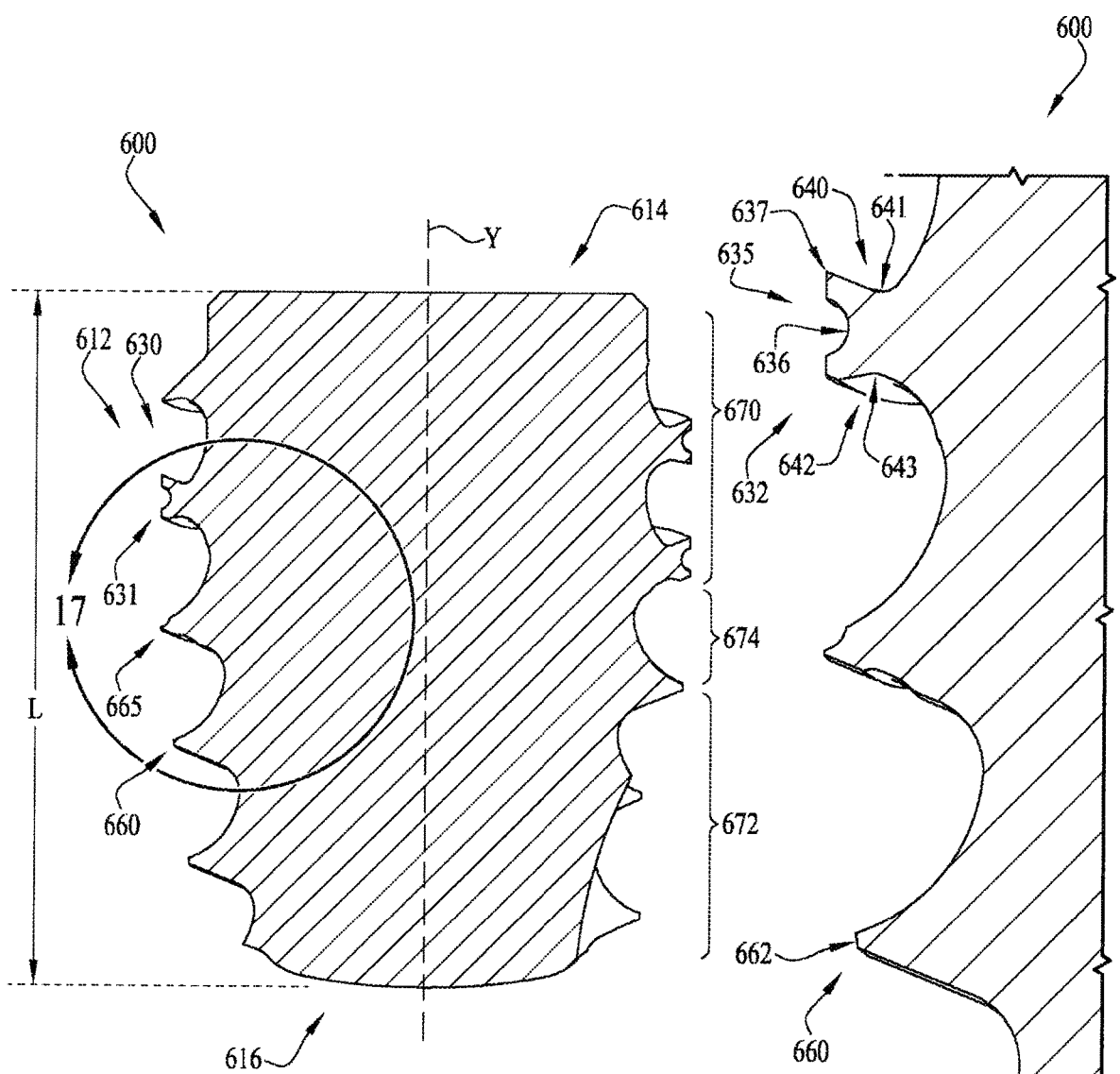

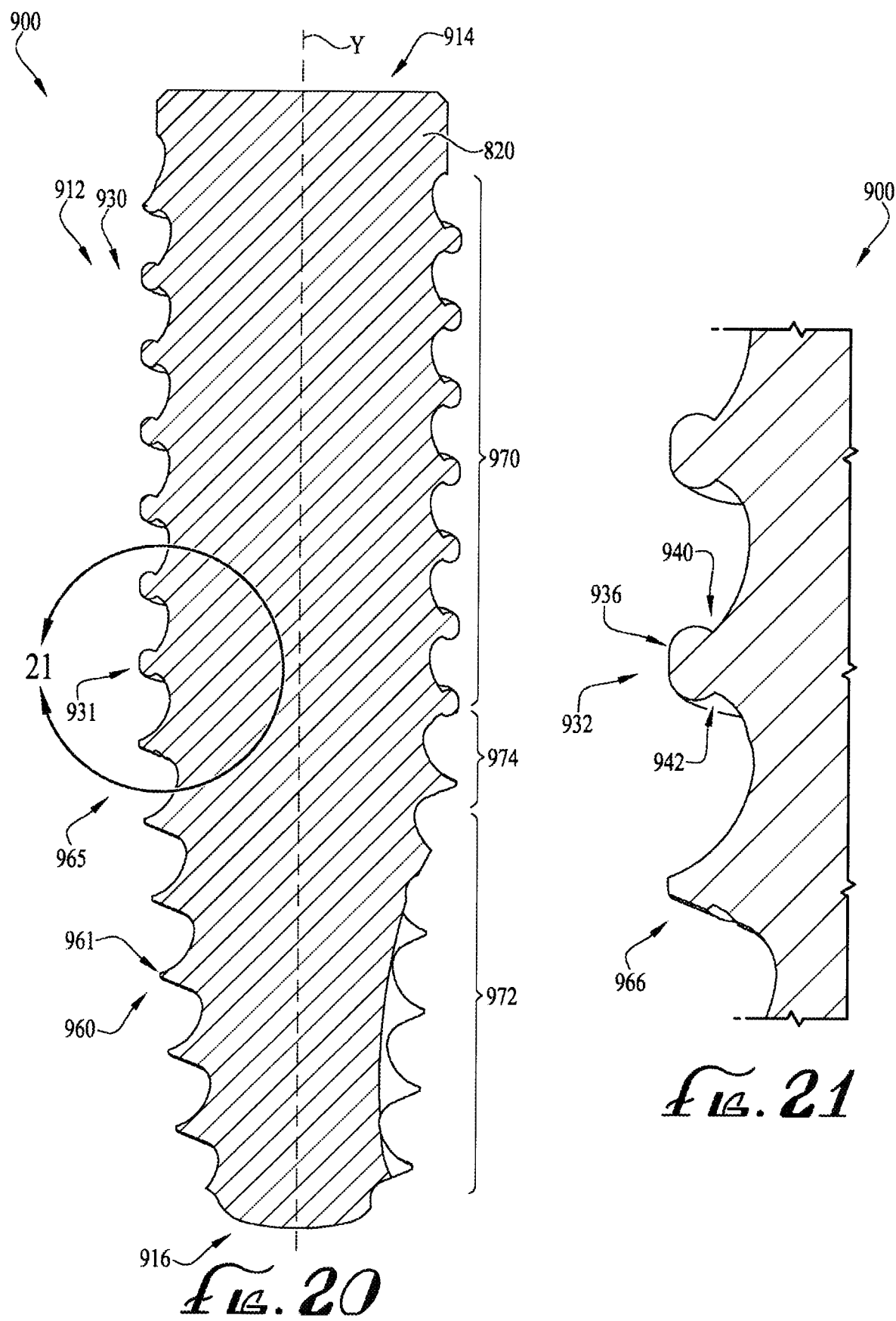

THREE-DIMENSIONAL STABILIZATION THREAD FORM FOR DENTAL IMPLANTS

CROSS-REFERENCE TO RELATED APPLICATION

This application is a continuation of U.S. Non-Provisional patent application Ser. No. 16/157,530 filed Oct. 11, 2018, which claims the benefit of U.S. Provisional Patent Application Ser. No. 62/570,890 filed Oct. 11, 2017, the entireties of which are hereby incorporated by reference herein.

TECHNICAL FIELD

The present invention relates generally to the field of dental implants, and more particularly to a dental implant having a three-dimensional stabilization thread form.

SUMMARY

In example embodiments, the present invention provides a dental implant including a tapered body and threads formed along the tapered body. In example forms, the threads can be single or multi-lead and include multiple thread forms, for example, three-dimensional stabilization thread forms and standard thread forms (e.g. v-thread, buttress thread, etc.) and/or any combination of the aforementioned threads across the single or multi-leads.

In one aspect, the present invention relates to a dental implant including a tapered body and an external thread form formed along an outer periphery of the tapered body, the external thread form including a root portion and a crest portion, the root portion defined near a proximal portion of the external thread form and the crest portion defined near a distal portion of the thread form, the external thread form including a superior flank portion and an inferior flank portion, the superior flank portion defined near a portion of the thread form towards the upper end of the dental implant between the crest and the root, and the inferior flank portion defined near a portion of the thread form towards the lower end of the dental implant between the crest and root, wherein the external thread form includes a feature set comprised of curved surfaces, linear surfaces, or any combination thereof formed along at least a portion of the crest portion, root portion, superior flank portion, inferior flank portion, or any combination thereof, including combinations of feature sets across multi-lead threads, to three-dimensionally stabilize the dental implant in a full or partial osteotomy.

In example embodiments, the three-dimensional stabilization feature set can include a plurality of variations of a curved geometry, linear geometry, or any combination thereof, wherein a larger shape or dimension, relative to a horizontal plane that is perpendicular to the longitudinal axis of the implant and passes through the crest portion of the thread, is defined at the distal portion of the thread form and a smaller shape or dimension is defined at the proximal portion of the thread form. In example embodiments, the three-dimensional stabilization feature set can be defined at the superior flank portion of the thread form, the inferior flank portion of the thread form, the crest portion of the thread form, or any combination thereof, including combinations across multi-lead threads, wherein the feature set acts as a mechanical retention or friction retention feature that stabilizes the implant.

In example embodiments, the three-dimensional stabilization feature set can include a plurality of variations of a curved geometry, linear geometry, or any combination thereof, wherein a larger shape or dimension, relative to a horizontal plane that is perpendicular to the longitudinal axis of the dental implant and passes through the crest portion of the thread, is defined at the distal portion of the thread form and a smaller shape or dimension is defined at the proximal portion of the thread form. In example embodiments, the external thread form includes a single thread form having a curved feature set, linear feature set, or any combination of curved and linear feature sets defined at the crest portion thereof. In example embodiments, the external thread form includes a plurality of thread forms, wherein at least one of the multiple thread forms includes a curved feature set, a linear feature set, or any combination of curved and linear feature sets defined at the crest portion thereof. In example embodiments, the external thread form includes either a single external thread formed along the outer periphery of the tapered body or one or more multi-lead external threads, where any surface or combination of surfaces across the multi-lead threads have a curved feature set, linear feature set, or any combination of curved and linear feature sets defined at the crest portion thereof, form along the outer periphery of the tapered body.

In example embodiments, the cutting flute can be configured to define a helical path, a linear path, or other desirable paths. In example embodiments, the tapered body defines a lateral wall region and an apical wall region. In example embodiments, a transition region is defined between the lateral wall region and the apical wall region. In example embodiments, the cutting flute can be configured to interrupt one or more portions of the external thread form. In example embodiments, multiple cutting flutes are provided for interrupting a plurality of portions of the external thread form. In example embodiments, the cutting flute can be an apical cutting flute, a lateral cutting flute, or a combination of both apical and lateral cutting flutes.

In example embodiments, the implant is configured for insertion into a maxillofacial bone and tissue of a patient. In example embodiments, the maxillofacial bone includes the mandible or maxilla.

In another aspect, the present invention relates to an implant including a body and at least one thread formed along the body, the body including a lateral portion and an apical portion, wherein the at least one thread is formed along the lateral and apical portions, and wherein at least a first portion of the thread includes a standard thread form (e.g. v-thread, buttress thread, etc.) and wherein at least a second portion of the thread includes a three-dimensional stabilizing thread form.

In another aspect, the present invention relates to an implant including a body and at least one thread formed along the body, the body including a lateral portion and an apical portion, wherein the at least one thread is formed along the lateral and apical portions, and wherein at least a portion of the thread includes a three-dimensional stabilizing thread form.

In yet another aspect, the present invention relates to a dental implant including a tapered body and an external thread form formed along an outer periphery of the tapered body. In example embodiments, the tapered body has a longitudinal axis and distal and proximal ends, and a lateral wall region and an apical wall region. The external thread form includes at least one thread profile, wherein the thread profile has a root, a crest portion, a superior flank portion, and an inferior flank portion. The root is defined at a proximal portion of the external thread form. The crest portion is defined near a distal portion of the thread form. The superior flank portion positioned on a superior portion of the thread between the crest portion and the root of the thread form, and the inferior flank portion positioned on an inferior portion of the thread between the crest portion and the root of the thread form. In example embodiments, the thread profile includes a three-dimensional stabilization thread having an undercut along the inferior flank portion, the superior flank portion or a combination of both the inferior flank portion and the superior flank portion. The undercut is defined by at least one surface selected from the group consisting of a curved surface, a linear surface, or combinations thereof, between the root and crest portion of the thread form.

In another aspect, the present invention relates to a dental implant including a tapered body and a multi-lead external thread form formed along an outer periphery of the tapered body. In example embodiments, the tapered body has a longitudinal axis and distal and proximal ends, and a lateral wall region and an apical wall region. The external thread form includes at least two distinct thread profiles, wherein each thread profile has a root, a crest portion, a superior flank portion, and an inferior flank portion. The root is defined at a proximal portion of the external thread form. The crest portion is defined near a distal portion of the thread form. The superior flank portion positioned on a superior portion of the thread between the crest portion and the root of the thread form, and the inferior flank portion positioned on an inferior portion of the thread between the crest portion and the root of the thread form. In example embodiments, at least one of the at least two distinct thread profiles includes a three-dimensional stabilization thread having an undercut in the inferior flank portion, the superior flank portion or a combination of both the inferior and superior flank portion, the undercut defined by at least one surface selected from the group consisting of a curved surface, a linear surface, or combinations thereof, between the root and crest portion of the thread form.

In yet another aspect, the present invention relates to a dental implant including a tapered body and an external thread form formed along an outer periphery of the tapered body. In example embodiments, the tapered body has a longitudinal axis and distal and proximal ends, and a lateral wall region and an apical wall region. A transition region positioned between the lateral wall and apical wall regions. The external thread form includes at least one thread profile, wherein the thread profile has a root, a crest portion, a superior flank portion, and an inferior flank portion. The root is defined at a proximal portion of the external thread form. The crest portion is defined near a distal portion of the thread form. The superior flank portion positioned on a superior portion of the thread between the crest portion and the root of the thread form, and the inferior flank portion positioned on an inferior portion of the thread between the crest portion and the root of the thread form. In example embodiments, the thread profile includes a three-dimensional stabilization thread having an undercut along the inferior flank portion, the superior flank portion or a combination of both the inferior flank portion and the superior flank portion. The undercut is defined by at least one surface selected from the group consisting of a curved surface, a linear surface, or combinations thereof, between the root and crest portion of the thread form.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 6 is a cross-sectional view of the implant of FIG. 5.

FIG. 7 is a detailed view of a portion of the thread form of FIG. 6.

FIG. 8 is a cross-sectional view of the implant according to another example embodiment of the present invention.

FIG. 9 is a detailed view of a portion of the thread form of FIG. 8.

FIG. 10 is a cross-sectional view of the implant according to another example embodiment of the present invention.

FIG. 11 is a detailed view of a portion of the thread form of FIG. 10.

FIG. 12 is a cross-sectional view of the implant according to another example embodiment of the present invention.

FIG. 13 is a detailed view of a portion of the thread form of FIG. 12.

FIG. 14 is a cross-sectional view of the implant according to another example embodiment of the present invention.

FIG. 15 is a detailed view of a portion of the thread form of FIG. 14.

FIG. 16 is a cross-sectional view of the implant according to another example embodiment of the present invention.

FIG. 17 is a detailed view of a portion of the thread form of FIG. 16.

FIG. 20 is a cross-sectional view of the implant according to another example embodiment of the present invention.

FIG. 21 is a detailed view of a portion of the thread form of FIG. 20.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
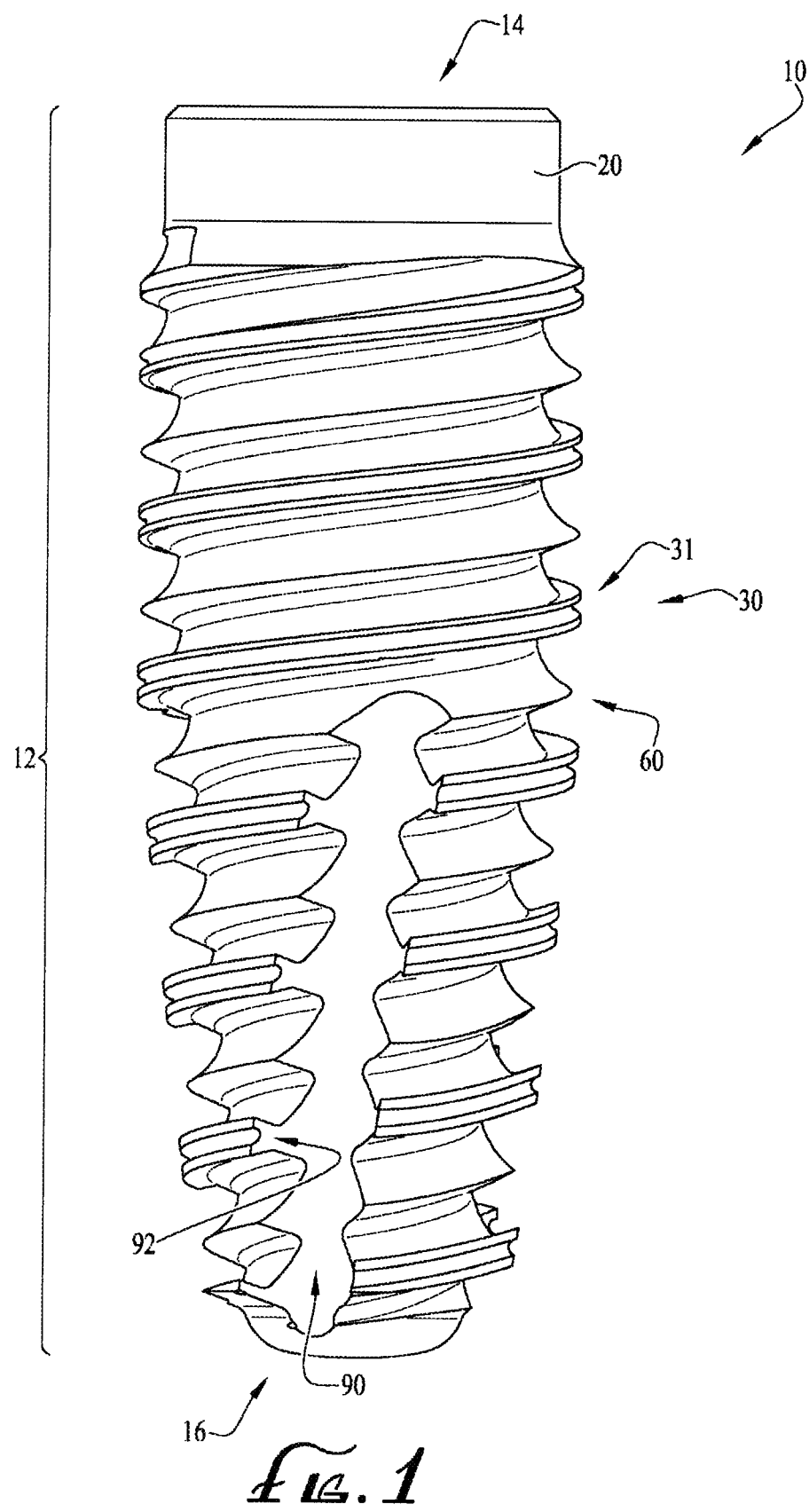
FIG. 1 is a front plan view of an implant according to an example embodiment of the present invention, the implant comprising a multi-lead thread form.

With reference now to the drawing figures, wherein like reference numbers represent corresponding parts throughout the several views, FIG. 1 shows a dental implant 10 for supporting an abutment onto which a prosthetic tooth is mounted. The implant is generally inserted into maxillofacial bone. In example embodiments, the implant 10 comprises a generally elongate body 12 comprising a first end 14 and a generally opposite second end 16. The first end 14 comprises an upper cylindrical portion 20 defining an abutment receiver that can vary in length (e.g., for receiving an abutment and abutment screw; internal geometry present but not shown).

In example embodiments, the implant 10 comprises one or more threads 30 formed on the body 12 between the first and second ends 14, 16, for example, which preferably assist in resisting or restricting three-dimensional movement of the implant 10 within a full or partial osteotomy. In example embodiments, the one or more threads 30 comprise a feature set comprised of curved surfaces, linear surfaces, or any combination thereof, for example, such that a crest or distal portion of the thread comprises an increased size or dimension, relative to a horizontal plane that is perpendicular to the longitudinal axis of the dental implant and passes through the crest portion of the thread, when compared to a proximal portion of the thread (e.g., generally near the root of the thread). According to one example embodiment, a substantially uniform thread form comprising a feature set with curved surfaces, linear surfaces, or any combination thereof, is provided and helically extends along the elongate body 12. According to another example embodiment, multiple thread forms comprising a plurality of feature sets comprised of curved surfaces, linear surfaces, or any combination thereof, are provided and extend along the elongate body 12. In example embodiments, the feature sets, comprised of curved surfaces, linear surfaces, or any combination thereof, of the one or more threads 30 (e.g., having greater shape and dimension, relative to a horizontal plane that is perpendicular to the longitudinal axis of the dental implant and passes through the crest portion of the thread, at the distal portion of the thread than the proximal portion) preferably restrict the one or more threads 30 from moving proximally toward the center of the full or partial osteotomy, thereby restricting lateral movement and substantially stabilizing the implant 10 in three-dimensions within the full or partial osteotomy. Preferably, the one or more threads and feature sets comprised of curved surfaces, linear surfaces, or any combination thereof, can be configured as desired, for example, such that the larger size or dimension, relative to a horizontal plane that is perpendicular to the longitudinal axis of the dental implant and passes through the crest of the thread, at the crest portion of the one or more threads 30, restricts lateral movement and substantially stabilizes the implant 10 in three-dimensions within the full or partial osteotomy.

As described above, the one or more threads 30 comprise a feature set comprised of curved surfaces, linear surfaces, or any combination thereof, for example, such that a crest or distal portion of the thread comprises an increased size or dimension, relative to a horizontal plane that is perpendicular to the longitudinal axis of the dental implant and passes through the crest portion of the thread, when compared to a proximal portion of the thread (e.g., generally near the root of the thread). In example embodiments, the feature set can optionally be formed along a superior flank portion and/or an inferior flank portion, for example, in addition to one or more feature sets being formed along the root or crest portions. Thus, in example embodiments, the one or more threads 30 comprise a feature set comprised of curved surfaces, linear surfaces, or any combination thereof, formed along at least a portion of the root portion, crest portion, superior flank portion, inferior flank portion, or any combination thereof.

Figures 2, 3:
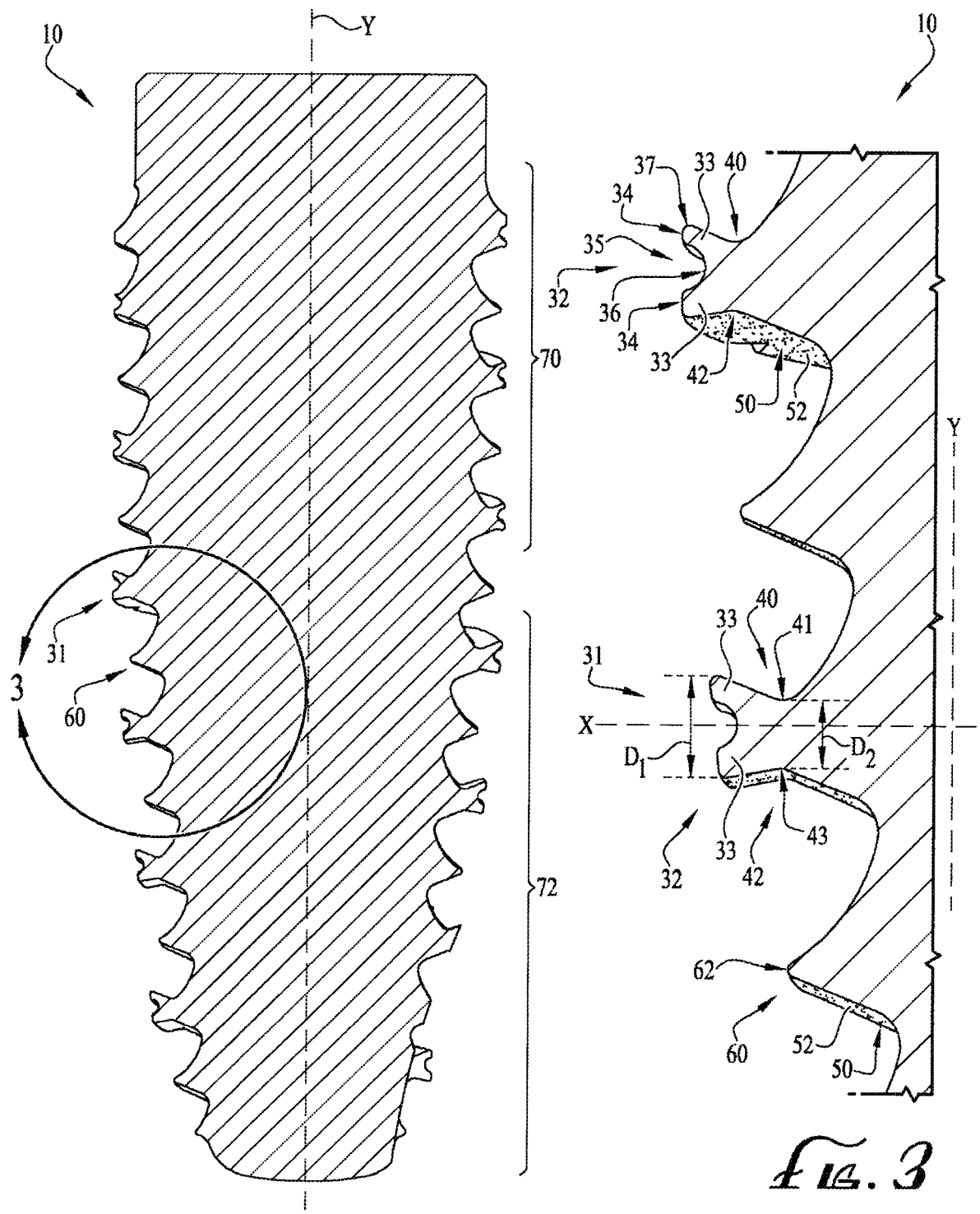
FIG. 2 is a cross-sectional view of the implant of FIG. 1.
FIG. 3 is a detailed view of a portion of the thread form of FIG. 2.

FIGS. 2-3 show the implant 10 in greater detail. In example embodiments, the implant 10 comprises a tapered body 12 defining a lateral portion 70 and an apical portion 72. In example embodiments, the tapered body 12 is preferably beneficial as the taper allows for the implant to improve its fitting with the anatomy of the maxillofacial bone. For example, in the case of either a full or partial osteotomy, the apical portion 42 along with the curved feature sets of the one or more threads (along the lateral portions, apical portions, or any combination thereof 70, 72) stabilizes the implant and maximizes the restriction of lateral movement of the implant 10 with the surrounding bone. In another example embodiment, in the case of a partial osteotomy (e.g., where portions of the implant become exposed or without a complete seal around the implant), the restriction of lateral movement caused by the one or more feature sets comprising of curved surfaces, linear surfaces, or any combination thereof, integrating with the surrounding bone substantially stabilizes the implant 10.

In example embodiments and as described above, the one or more threads 30 can be comprised of one or more feature sets comprising curved surfaces, linear surfaces, or any combination thereof, as desired. For example, as depicted in FIGS. 2-3, the implant 10 comprises a multi-lead thread with one or more threads 30 formed on the elongate body 12 between the first and second ends 14, 16, for example, which preferably assist in resisting or restricting lateral movement of the implant 10 within a full or partial osteotomy. In example embodiments, one or more thread forms on one or more multi-lead threads 30 comprise a feature set comprised of curved surfaces, linear surfaces, or any combination thereof, for example, such that a crest or distal portion of the thread, comprises an increased size or dimension, relative to a horizontal plane that is perpendicular to the longitudinal axis of the dental implant and passes through the crest portion of the thread, when compared to a proximal portion of the thread (e.g., generally near the root of the thread). According to one example embodiment, at least one substantially uniform thread form of the multi-lead threads comprises a feature set with curved surfaces, linear surfaces, or any combination thereof, is provided and helically extends along the elongate body 12 and comprises at least one of the multi-lead threads, the remaining threads being any standard threads (e.g. v-threads, buttress threads, etc.).

According to another example embodiment, at least one of the multiple thread forms of the multi-lead threads comprises a plurality of feature sets comprised of curved surfaces, linear surfaces, or any combination thereof, are provided and extend along the elongate body 12 and comprises at least one of the multi-lead threads, the remaining threads being any standard threads (e.g. v-threads, buttress threads, etc.). According to another example embodiment, at least two different threads of the multi-lead thread, individually comprising of a feature set of curved surfaces, linear surfaces, or any combination thereof, are combined to create a new feature set by the summation of the feature sets of the individual threads. In example embodiments, the feature sets, individual or combined, comprised of curved surfaces, linear surfaces, or any combination thereof, of the one or more threads 30 (e.g., having greater shape and dimension, relative to a horizontal plane that is perpendicular to the longitudinal axis of the dental implant and passes through the crest portion of the thread, at the distal portion of the thread than the proximal portion) preferably restrict the one or more threads 30 from moving proximally toward the center of the full or partial osteotomy, thereby restricting lateral movement and substantially stabilizing the implant 10 in three-dimensions within the full or partial osteotomy.

Preferably, the one or more threads and feature sets comprised of curved surfaces, linear surfaces, or any combination thereof, can be configured as desired, for example, such that the larger size or dimension, relative to a horizontal plane that is perpendicular to the longitudinal axis of the dental implant and passes through the crest of the thread, at the crest portion of the one or more threads 930, restricts lateral movement and substantially stabilizes the implant 900 in three-dimensions within the full or partial osteotomy.

For example, as shown in FIG. 3, the unique feature set 32 is generally provided at the crest or distal portion of the three-dimensional stabilization thread 31. In example embodiments, a larger shape or dimension D1, relative to a horizontal plane X that is perpendicular to the longitudinal axis Y of the dental implant (and passes through the crest portion of the thread) is present at a distal portion of the three-dimensional stabilization thread, and a smaller shape or dimension D2, relative to a horizontal plane X that is perpendicular to the longitudinal axis Y of the dental implant (and passes through the crest portion of the thread) is present at a proximal portion of the three-dimensional stabilization thread. As such, with the distal portion (near the crest) comprising the dimension D1, which is larger than the dimension D2 of the proximal portion (near the root), the implant is provided with stability and the restriction of lateral movement of the implant 10 with the surrounding bone is maximized.

Figure 4A:
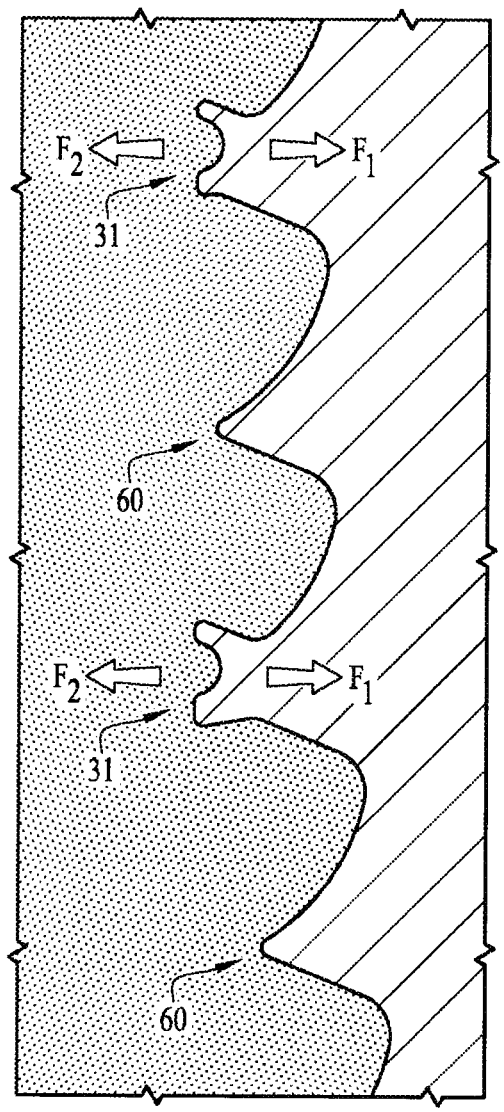
FIG. 4A-B show a vector diagram of the retention forces of the three-dimensional stabilization thread form of the implant of FIG. 1 in comparison to the lack of retentive forces of a standard thread.
Figure 4B:
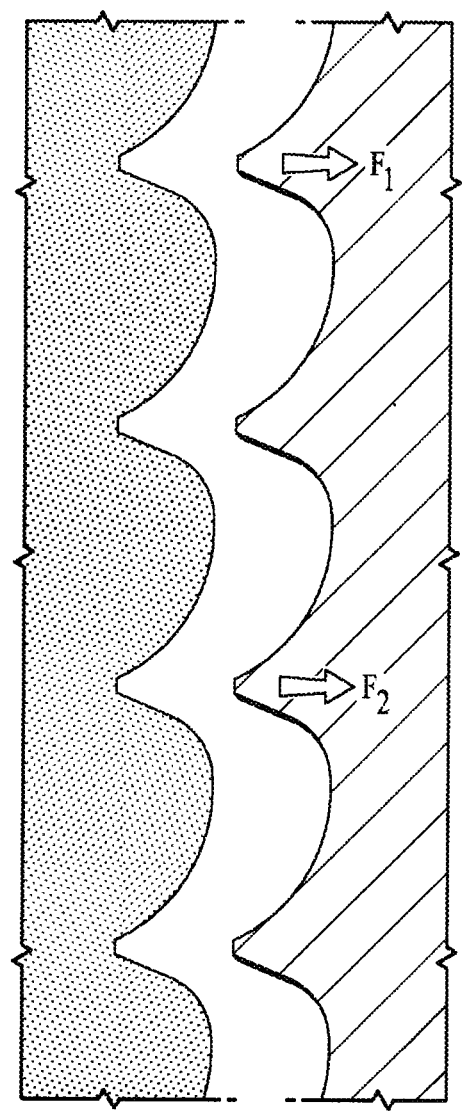

For example, as depicted in FIGS. 4A-B, a vector diagram of the retention forces of the three-dimensional stabilization thread form (see FIG. 4A) are compared to the lack of retentive forces of a standard thread (see FIG. 4B). In example embodiments and as depicted in FIG. 4A, a lateral force $F_1$ is applied on the implant 10 away from the full or partial osteotomy and a retentive force $F_2$ is applied by the bone of the full or partial osteotomy on the implant 10. Thus, the three-dimensional stabilization thread form 31 (and comprising a unique feature set) is configured such that the retentive force $F_2$ is applied by the bone of the full or partial osteotomy on the implant 10, thereby acting as a mechanical retention or friction retention feature to stabilize the implant 10. In contrast as depicted in FIG. 4B, the standard thread lacks a thread form to provide for three-dimensional stabilization, thereby not providing any mechanical retention or friction retention features to stabilize the implant.

Referring back to FIG. 3, the unique feature set 32 of the three-dimensional stabilization thread form 31 can comprises curved surfaces, linear surfaces, or any combination thereof, formed along at least a portion of the root portion, the crest portion, superior flank portion, inferior flank portion, or any combination thereof. According to one example embodiment, the unique feature set 32 is defined by an inferior flank portion 40 and a superior flank portion 42 and comprises a pair of projections or extensions 33 outwardly-extending away from the root portion and a crest relief feature 35 formed generally between the extensions 33.

In example embodiments, the crest relief feature 35 comprises a non-linear or curved feature or surface 36, which is generally defined between the extensions 33 and can comprise a desirable depth, for example, such that the curved surface 36 of the crest relief feature 35 can be recessed a desired distance (from the distal end towards the root) between the extensions 33. According to example embodiments, each of the extensions 33 comprise an end surface 34, and corner portions of the extensions 33 comprise transitional edges 37, for example, which further extend to the inferior and superior flank portions 40, 42. According to other example embodiments, the crest relief feature need not have a curved surface 36, for example, but can instead have one or more linear surfaces, or any combination of curved and linear geometry.

For example, according to example embodiments of the invention, the distal end of the three-dimensional stabilization thread 31 defines the larger dimension D1, for example, which is generally defined between outermost end portions of the extensions 33, and the smaller dimension D2 is defined at a proximal portion of the three-dimensional stabilization thread 31 near the inferior and superior flank portions 40, 42 (see FIG. 3). According to example embodiments, a radiused or curved transition 41 is provided at the inferior flank portion 40 and a radiused or curved transition 43 is provided at the superior flank portion 42. According to alternate embodiments of the invention, so long as the larger dimension D1 is greater than the smaller dimension D2, the crest relief feature can comprise other desired shapes. According to one example embodiment, the crest relief feature 35 is preferably uniformly curved and generally centered to define an inwardly and radially-extending surface between the extensions 33. According to example embodiments, the tapered standard threads 60 comprise a transitional edge 62 at the distal portion thereof.

According to example embodiments, after the implant 10 has been machined so as to define the multi-lead threads comprising the three-dimensional stabilization threads 31 and the tapered standard threads 60, the implant body 12 is further processed by a particle blast process. According to example embodiments, the particle blast process preferably rounds the edges of the three-dimensional stabilization threads 31 and the tapered standard threads 60 while also roughening/texturizing an outer surface of the implant 10 (and threads 31, 60 thereof). For example, as depicted in FIGS. 2-3, the end surfaces 34 and transitional edges 37, 62 are at least partially rounded such that a pointed or generally sharp edge is nonexistent, for example, so that no definite edge is defined between two converging surfaces along the threads 31, 60. Thus, according to example embodiments, after the particle blast process, the threads 31, 60 comprise rounded or generally curved edges defined along portions of the threads 31, 60.

According to example embodiments, the particle blast process preferably roughens or texturizes the outer surface of the implant such that the osseointegration of the dental implant to the surrounding bone is improved. According to example embodiments and as best depicted in FIG. 3, an outer surface 50 of the implant comprises a roughened surface 52 (in Sa) of between about 0.5-4.0 µm. In alternate example embodiments, the roughened surface can preferably be chosen as desired, for example, less 0.5 µm or greater than 4.0 µm (see also FIGS. 22-23).

Referring back to FIG. 1, the implant 10 can preferably comprise one or more self-tapping features or cutting flutes 90, for example, which can interrupt the threads 30 by extending along any desirable path or pattern (e.g., helical, linear, other desirable path or pattern) along the body 12. For example, a cutting flute 90 is depicted in FIG. 1, wherein the flute 90 generally extends along a helical path and defines a plurality of interruptions 92 with the threads 30. According to another example embodiment, the cutting flute 90 extends along a generally linear path and defines a plurality of interruptions 92.

Figure 5:
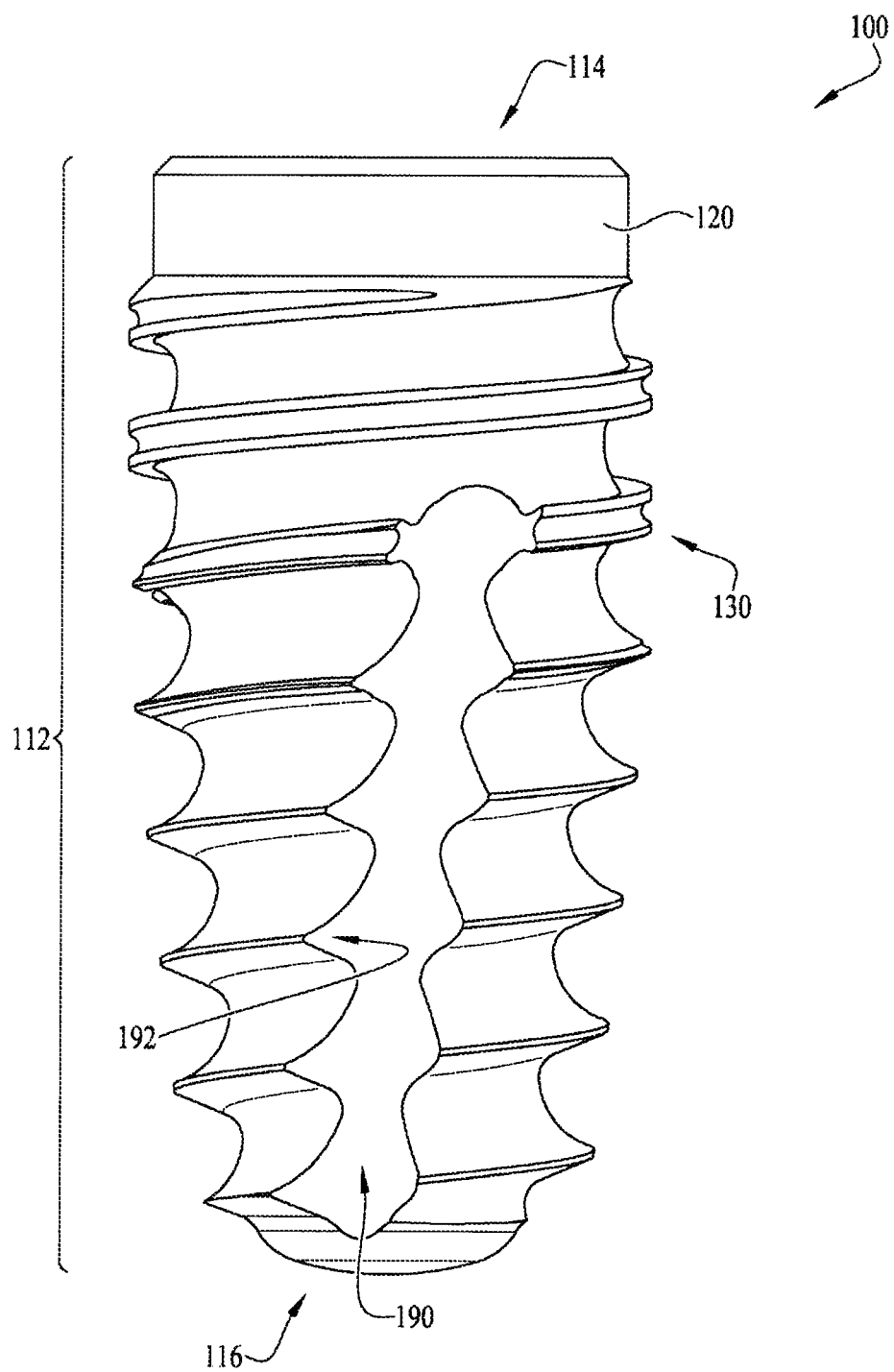
FIG. 5 is a front plan view of an implant according to another example embodiment of the present invention.

FIGS. 5-7 show an implant 100 according to another example embodiment of the present invention. According to example embodiments, the implant 100 is generally similar to the implant 10 described above, for example, comprising a lateral portion 170 and an apical portion 172 and comprising at least one three-dimensional stabilization thread form. In example embodiments, the implant 100 comprises threads 130 including a three-dimensional stabilization thread form 131 comprising a unique feature set 132 at the crest or distal portion of the thread and the apical portion 172 of the body comprises tapered standard threads 160 (e.g. v-threads, buttress threads, etc.). According to example embodiments, a transition portion 174 defines a thread form transition zone 165. In example embodiments, a transition thread form 165 is defined between the tapered standard threads 160 (e.g. v-threads, buttress thread, etc.) and the three-dimensional stabilization thread form 131.

As depicted in FIGS. 6-7, the three-dimensional thread form 131 comprises the unique feature set 132 at the crest or distal portion of the thread. According to one example embodiment, a crest relief feature 135 is provided, for example, which can comprise curved, linear, or any combination of curved and linear geometry. As depicted in FIG. 7 and according to one example embodiment, the crest relief feature 135 comprises a nonlinear or curved feature or surface 136 formed at the crest or distal portion of the thread.

According to one example embodiment as similarly described above with respect to the implant 10, the unique feature set 132 is defined by an inferior flank portion 140 and a superior flank portion 142, and the crest relief feature is formed at the distal portion thereof such that a pair of extensions 133 are defined so as to outwardly extend away from the root portion (and each other).

In example embodiments, the crest relief feature 135 comprises a non-linear or curved feature or surface 136, which is generally defined between the extensions 133 and can comprise a desirable depth, for example, such that the curved surface 136 of the crest relief feature 135 can be recessed a desired distance (from the distal end towards the root) between the extensions 133. According to example embodiments, each of the extensions 133 comprise an end surface 134, and corner portions of the extensions 133 comprise transitional edges 137, for example, which further extend to the inferior and superior flank portions 140, 142. According to other example embodiments, the crest relief feature need not have a curved surface, for example, but can instead have one or more linear surfaces, or any combination of curved and linear geometry.

As similarly described above, after the implant 100 has been machined so as to define the threads 130 comprising the three-dimensional stabilization threads 131 and the tapered standard threads 160, the implant body 112 is further processed by a particle blast process. As depicted in FIGS. 2-3, the threads 30 formed on the body 12 are depicted according to post particle blast process (e.g., with roughened surface and rounded transitional edges). As is depicted throughout FIGS. 5-22, the body and thread forms thereof are depicted according to their shape and geometry after being machined but before the particle blast process. Accordingly, as will be described herein, while the embodiments of FIGS. 5-22 do not include the resulting rounding and roughening of the particle blast process, it is to be understood that the particle blast process may be provided after the implant has been machined. Accordingly, according to one example embodiment of the present invention, the particle blast process is provided for each of the embodiments of FIGS. 1-23, and the resulting form preferably comprises rounded edges or transitions and an outer surface of the body (and threads thereof) comprises a roughened surface. According to example embodiments, an outer surface 150 of the implant comprises a roughened surface 152 (in Sa) of between about 0.5-4.0 µm. In alternate example embodiments, the roughened surface can preferably be chosen as desired, for example, less 0.5 µm or greater than 4.0 µm (see also FIGS. 22-23).

FIGS. 8-9 show an implant 200 according to another example embodiment of the present invention. According to example embodiments, the implant 200 is generally similar to the implants 10, 100 described above, for example, comprising a lateral portion 270 and an apical portion 272 and comprising at least one three-dimensional stabilization thread form. In example embodiments, the implant 200 comprises threads 230 including a three-dimensional stabilization thread form 231 comprising a unique feature set 232 at the crest or distal portion of the thread. In example embodiments, the three-dimensional stabilization thread form 231 is provided at the lateral portion 270, and the apical portion 272 of the body 212 comprises tapered standard threads 260 (e.g. v-threads, buttress threads, etc.). According to example embodiments, a transition portion 274 defines a thread form transition zone 265. In example embodiments, a transition thread form 266 is defined between the tapered standard threads 260 (e.g. v-threads, buttress thread, etc.) and the three-dimensional stabilization thread form 231.

In example embodiments, the three-dimensional thread form 231 comprises the unique feature set 232 at the crest or distal portion of the thread. According to one example embodiment, a crest relief feature 235 is provided, for example, which can comprise curved, linear, or any combination of curved and linear geometry. As depicted in FIG. 9 and according to one example embodiment, the crest relief feature 235 comprises a nonlinear or curved feature or surface 236 formed at the crest or distal portion of the thread.

According to one example embodiment as similarly described above with respect to the implant 10, 100, the unique feature set 232 is defined by an inferior flank portion 240 and a superior flank portion 242, and the crest relief feature is formed at the distal portion thereof such that a pair of extensions 233 are defined so as to outwardly extend away from the root portion.

In example embodiments, the crest relief feature 235 comprises a non-linear or curved feature or surface 236, which is generally defined between the extensions 233 and can comprise a desirable depth, for example, such that the curved surface 236 of the crest relief feature 235 can be recessed a desired distance (from the distal end towards the root) between the extensions 233. According to example embodiments, each of the extensions 233 comprise an end surface 234, and corner portions of the extensions 233 comprise transitional edges 237, for example, which further extend to the inferior and superior flank portions 240, 242. According to other example embodiments, the crest relief feature need not have a curved surface, for example, but can instead have one or more linear surfaces, or any combination of curved and linear geometry.

As similarly described above, after the implant 200 has been machined so as to define the threads 230 comprising the three-dimensional stabilization threads 231 and the tapered standard threads 260, the implant body 212 can be further processed by a particle blast process. According to one example embodiment, the implant 200 is provided with a post-machining particle blast process. The resulting form preferably comprises rounded edges or transitions and an outer surface of the body (and threads thereof) comprises a roughened surface. According to example embodiments, an outer surface 250 of the implant comprises a roughened surface 252 (in Sa) of between about 0.5-4.0 µm. In alternate example embodiments, the roughened surface can preferably be chosen as desired, for example, less 0.5 µm or greater than 4.0 µm (see also FIGS. 22-23).

FIGS. 10-11 show an implant 300 according to another example embodiment of the present invention. According to example embodiments, the implant 300 is generally similar to the implants 10, 100, 200 described above, for example, comprising a lateral portion 370 and an apical portion 372 and comprising at least one three-dimensional stabilization thread form. In example embodiments, the implant 300 comprises threads 330 including a three-dimensional stabilization thread form 331 comprising a unique feature set 332 at the crest or distal portion of the thread. In example embodiments, the three-dimensional stabilization thread form 331 is provided at the lateral portion 370, and the apical portion 372 of the body 312 comprises tapered standard threads 360 (e.g. v-threads, buttress threads, etc.). According to example embodiments, a transition portion 374 defines a thread form transition zone 365. In example embodiments, a transition thread form 366 is defined between the tapered standard threads 360 (e.g. v-threads, buttress thread, etc.) and the three-dimensional stabilization thread form 331.

According to example embodiments, the three-dimensional thread form 331 comprises the unique feature set 332 at the crest or distal portion of the thread. According to one example embodiment, a crest feature is provided, for example, which comprises a generally linear surface 334. For example, rather than the curved crest relief feature 236 of the implant 200, the crest feature 334 generally comprises a linear surface feature, for example, without any relief feature. Optionally, the crest feature 334 can comprise curved, linear, or any combination of curved and linear geometry.

According to example embodiments, the implant 300 is substantially similar to the implant 200, for example, except that the implant 300 does not have a crest relief feature. Accordingly, as similarly described above, the implant 300 can comprise rounded edges and transitions and a roughened outer surface (e.g., by undergoing a particle blast process).

FIGS. 12-13 show an implant 400 according to another example embodiment of the present invention. As depicted, the implant 400 is generally similar to the implant 100 as described above, however the apical portion 472 has a three-dimensional stabilization thread form 431 with a unique feature set 432 at the crest or distal portion of the thread, wherein the lateral portion 470 of the body 412 comprises tapered standard threads 460 (e.g. v-threads, buttress threads, etc.), and wherein the transition portion 474 defines a thread form transition zone 465. According to example embodiments, the unique feature set 432 is generally similar to the unique feature sets 10, 100 as described above.

FIGS. 14-15 show an implant 500 according to another example embodiment of the present invention. As depicted, the implant 500 is generally similar to the implant 100 as described above, however both the lateral portion 570 and the apical portion 572 have a continuous three-dimensional stabilization thread form 531 comprising a unique feature set 532 at the crest or distal portion of the thread. According to example embodiments, the unique feature set 532 is generally similar to the unique feature sets 10, 100 as described above.

FIGS. 16-17 show an implant 600 according to another example embodiment of the present invention. As depicted, the implant 600 is generally similar to the implant 100 as described above, for example, comprising the lateral portion 670 having a three-dimensional stabilization thread form 631 comprising a unique feature set 632 at the crest or distal portion of the thread, wherein the apical portion 672 of the body 612 comprises tapered standard threads 660 (e.g. v-threads, buttress threads, etc.), and wherein the transition portion 674 defines a thread form transition zone 665. According to example embodiments, the implant 600 an overall length L of less than or equal to 8 millimeters. According to another example embodiment, the length L is about 8 millimeters or greater, for example, which is generally depicted in FIGS. 5-7. According to example embodiments, the unique feature set 632 is generally similar to the unique feature sets 10, 100 as described above.

Figure 18:
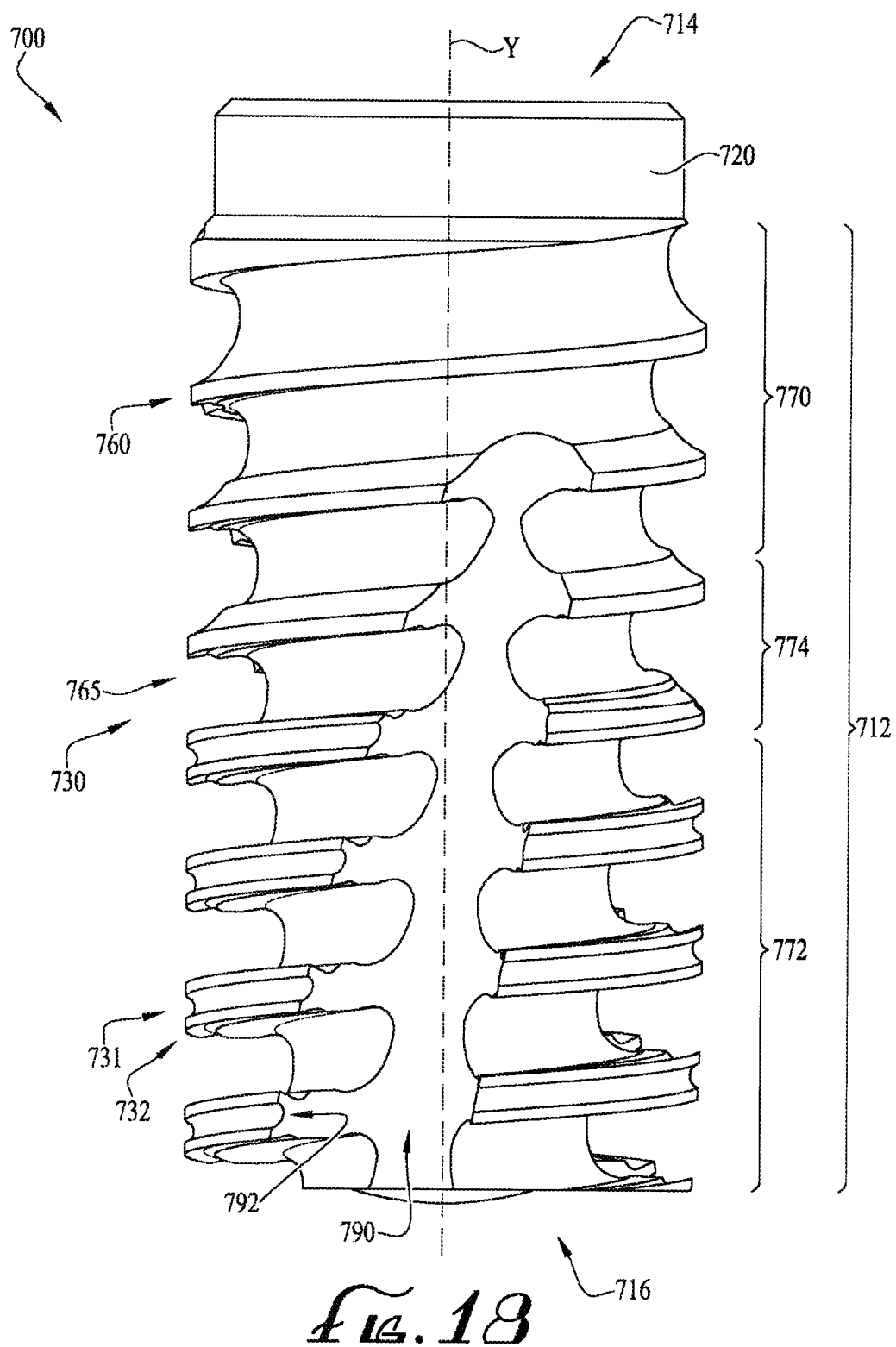
FIG. 18 is a front plan view of an implant according to another example embodiment of the present invention.
Figure 19:
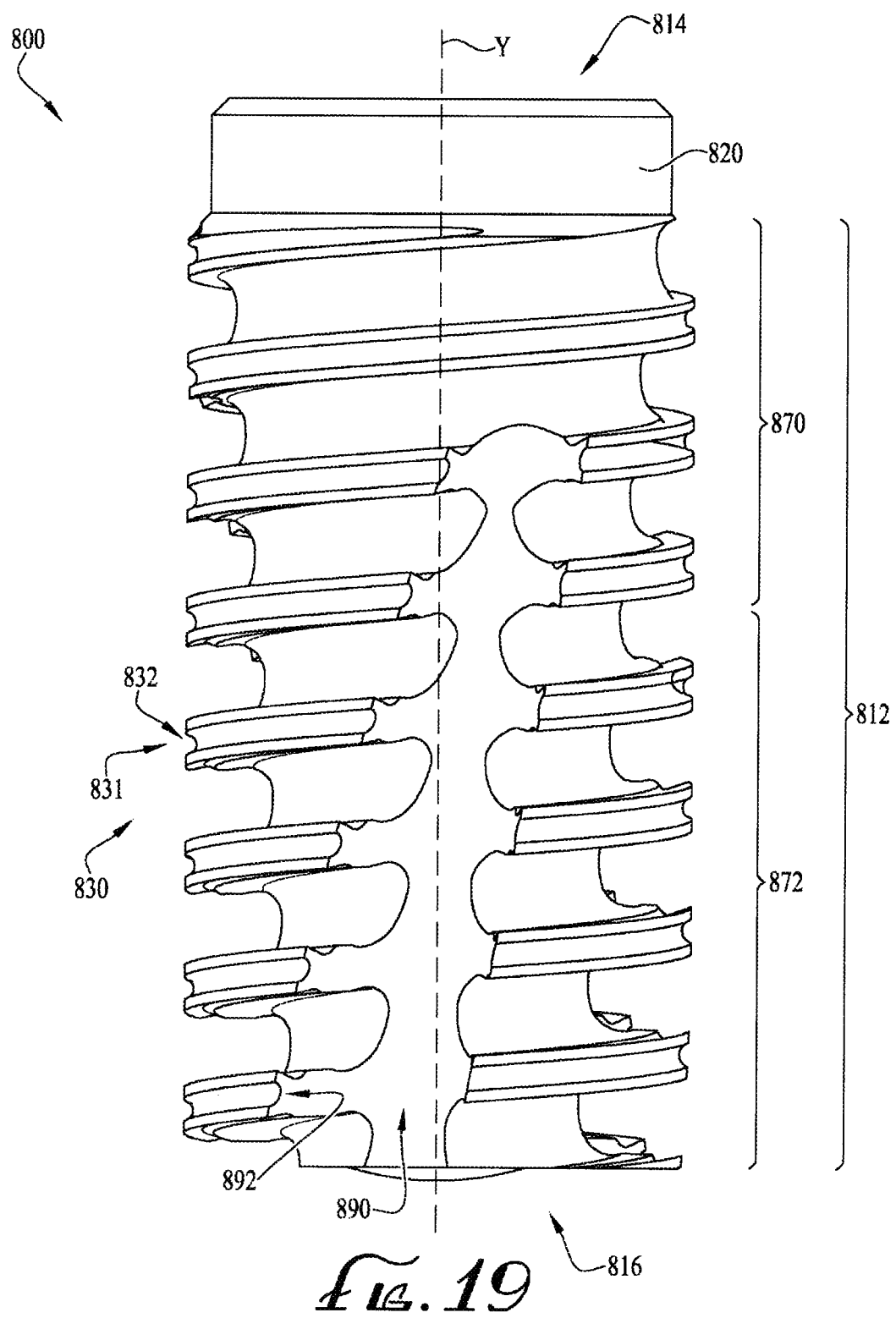
FIG. 19 is a front plan view of an implant according to another example embodiment of the present invention.

FIGS. 18-19 show implants 700, 800 according to additional example embodiments of the present invention. FIG. 18 shows the implant 700, for example, which has an overall tapered body 712 with one or more thread forms and/or one or more thread leads that remain parallel and do not taper with the body of the implant. The implant 700 is similar to the implant 400, as described above, in that the apical portion 772 has a three-dimensional stabilization thread form 731 with a unique feature set 732 at the crest or distal portion of the thread, wherein the lateral portion 770 of the body 712 comprises tapered standard threads 760 (e.g. v-threads, buttress threads, etc.), and wherein the transition portion 774 defines a thread form transition zone 765. According to example embodiments, the unique feature set 732 is generally similar to the unique feature sets 10, 100 as described above. FIG. 19 shows the implant 800, which is generally similar to the implant 700 as described above, for example, having an overall tapered body with one or more thread forms and/or one or more thread leads that remain parallel and do not taper with the body of the implant. The implant 800 is similar to the implant 500, as described above, in that both the lateral portion 870 and the apical portion 872 have a continuous three-dimensional stabilization thread form 831 comprising a unique feature set 832 at the crest or distal portion of the thread.

FIGS. 20-21 show an implant 900 according to another example embodiment of the present invention. As depicted, the implant 900 is generally similar to the implant 100 as described above, for example, comprising a body 912 comprising threads 930. In example embodiments, the threads 30 can comprise one or more feature sets comprising curved surfaces, linear surfaces, or any combination thereof, as desired. As shown in FIG. 20, a lateral portion 970 of the body 912 comprises a three-dimensional stabilization thread form 931 comprising a unique feature set 932 at the crest or distal portion of the thread 930. An apical portion 972 of the body 912 comprises tapered standard threads 960 (e.g. v-threads, buttress threads, etc.), and a transition portion 974 defines a thread form transition zone 965 comprising a standard thread 966 (e.g. v-threads, buttress thread, etc.). According to example embodiments, the unique feature set 932 comprises an inferior and superior portion 940, 942 defining a smaller dimension, and wherein a radiused surface 936 is defined at a crest or distal portion of the thread 931 to define a larger dimension, for example, as similarly described with respect to the three-dimensional stabilization thread forms of the implants 10, 100.

Figure 22:
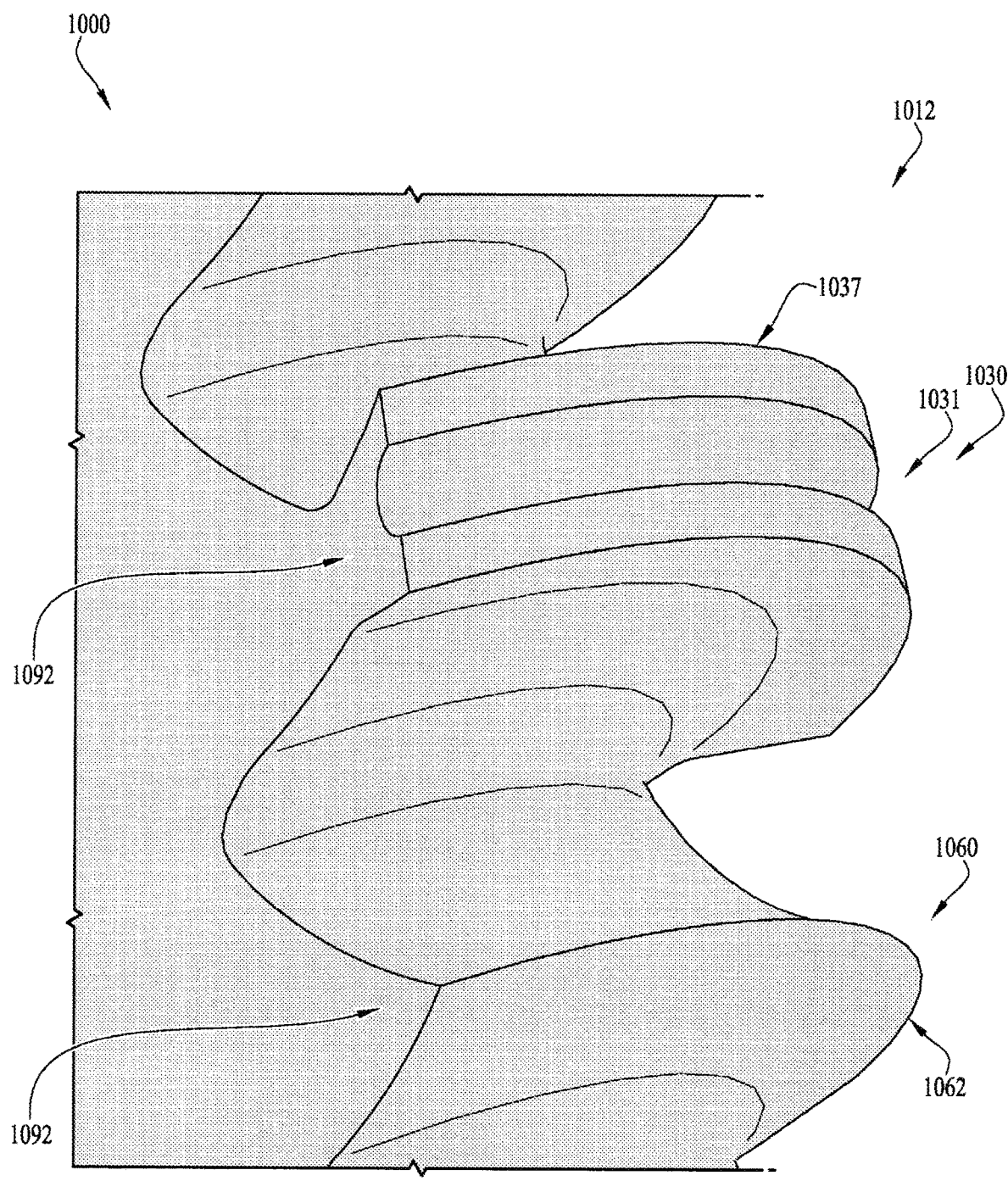
FIG. 22 is a detailed perspective view of a portion of an implant according to another example embodiment of the present invention, the implant comprising a three-dimensional thread form defining one or more edges thereon and prior to post processing.
Figure 23:
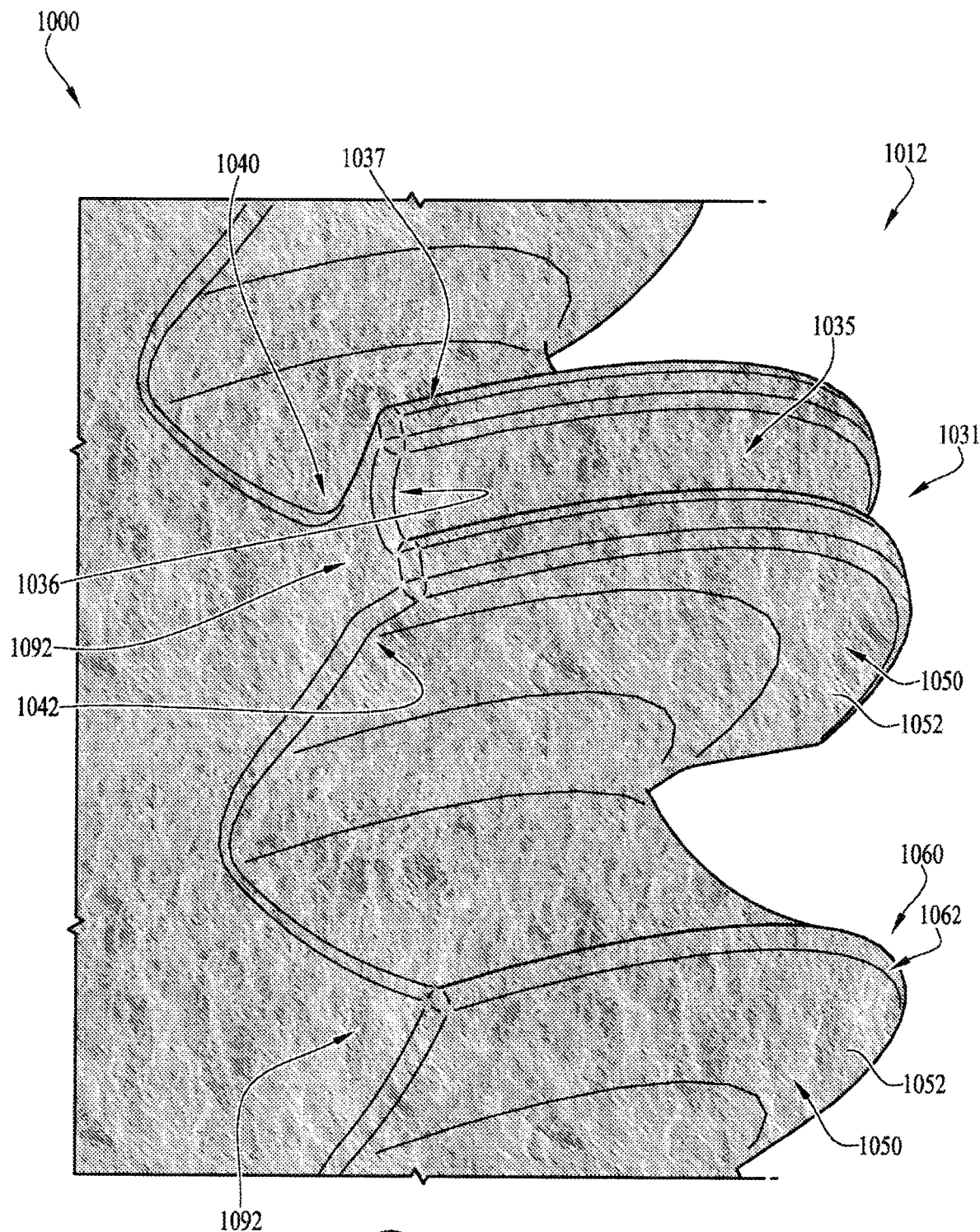
FIG. 23 is a detailed view of the implant of FIG. 22, showing the edges of the thread form being rounded and the surfaces thereof being roughened after completion of post processing of the implant.

FIGS. 22-23 show an implant 1000 according to another example embodiment of the present invention. For example, as described above, after the implant 10 has been machined so as to define the multi-lead threads comprising the three-dimensional stabilization threads 1031 and the tapered standard threads 1060 (or various other thread forms as described herein), the implant body 1012 is further processed by a particle blast process. For example, the implant 1000 of FIG. 22 shows the transitional edges 1037, 1060 and the leading edges 1092 (defined by the cutting flute) having substantially defined edges and intersections between the feature sets of the threads 1030. However, after completion of the particle blast process, the transitional edges 1037, 1060, leading edges 1092 (any any other defined intersections or edges) of the threads 1030 are preferably rounded. Furthermore, an outer surface 1050 of the threads 1030 comprises a roughened surface 1052, for example, which is preferably present about the entirety of the outer surface of the 1050 of the body 1012. According to example embodiments, the particle blast process preferably roughens or texturizes the outer surface of the implant such that the osseointegration of the dental implant to the surrounding bone is improved. According to example embodiments and as best depicted in FIG. 23, an outer surface 1050 of the implant body 1012 comprises a roughened surface 1052 (in Sa) of between about 0.5-4.0 μm. In alternate example embodiments, the roughened surface can preferably be chosen as desired, for example, less 0.5 μm or greater than 4.0 μm.

As similarly described above, the one or more threads 30, 130, 230, 330, 430, 530, 630, 730, 830, 930, 1030 of the implants 10, 100, 200, 300, 400, 500, 600, 700, 800, 900, 1000 can comprise a feature set on one or more leads, comprised of curved surfaces, linear surfaces, or any combination thereof, formed along at least a portion of the root portion, crest portion, superior flank portion, inferior flank portion, or any combination across any and all thread leads thereof. In example embodiments and as similarly described above, the implants 10, 100, 200, 300, 400, 500, 600, 700, 800, 900, 1000 can comprise one or more self-tapping cutting flutes extending along the body and forming interruptions with the one or more threads. Optionally, according to other example embodiments of the present invention, the implants 10, 100, 200, 300, 400, 500, 600, 700, 800, 900, 1000 can comprise a desirable length, and other dimensional attributes of the implant, thread forms, unique feature sets, cutting flutes, etc. can be chosen as desired. Preferably, the one or more threads, thread forms, unique feature sets, etc. as described herein can be sized and shaped as desired, for example, to provide for maximizing the restriction of lateral movement of the implant within the full or partial osteotomy. According to some example embodiments, the implants 10, 100, 200, 300, 400, 500, 600, 700, 800, 900, 1000 comprise a tapered body comprising multiple thread forms, for example, a three-dimensional stabilization thread form and a standard thread (e.g. v-thread, buttress thread, etc.) form on single or multi-leads.

According to another example embodiment, the present invention comprises a method of manufacturing an implant comprising at least one three-dimensional stabilization thread form. In example embodiments, the method includes providing an tapered implant body; machining one or more threads along the tapered body, the one or more threads comprising a three-dimensional stabilization thread form; and treating the entirety of the body and one or more threads with a particle blast process. According to example embodiments, the particle blast process preferably roughens or texturizes the outer surface of the implant such that the osseointegration of the dental implant to the surrounding bone is improved. According to example embodiments, an outer surface of the implant body comprises a roughened surface (in Sa) of between about 0.5-4.0 μm. In alternate example embodiments, the roughened surface can preferably be chosen as desired, for example, less 0.5 μm or greater than 4.0 μm. According to example embodiments, any edges defined along one or more portions of the body (and one or more threads thereof) are substantially rounded.

While the invention has been described with reference to example embodiments, it will be understood by those skilled in the art that a variety of modifications, additions and deletions are within the scope of the invention, as defined by the following claims.

What is claimed is:

1. A dental implant comprising:
a body having a longitudinal axis and first and second ends, the body comprising a lateral wall region proximal the first end and an apical wall region proximal the second end, the apical wall region of the body being tapered from a larger outer diameter to a smaller outer diameter toward the second end, and the lateral wall region having a generally constant outer diameter; and
an external thread form formed along an outer periphery of the body in both lateral and apical wall regions, the external thread form comprising a constant external diameter defined along at least a portion of the lateral wall region, the external thread form comprising a first thread profile along at least a portion of the lateral wall region, and a second thread profile along at least a portion of the apical wall region;
wherein the second thread profile comprises a root, a crest portion, a superior flank portion, and an inferior flank portion, the root defined at a proximal portion of the external thread form, the crest portion defined near a distal portion of the thread form, the superior flank portion positioned on a superior portion of the thread between the crest portion and the root of the thread form, and the inferior flank portion positioned on an inferior portion of the thread between the crest portion and the root of the thread form, and wherein the second thread profile further comprises a three-dimensional stabilization thread having an undercut along the inferior flank portion, the superior flank portion or a combination of both the inferior flank portion and the superior flank portion, the undercut defined by at least one surface selected from the group consisting of a curved surface, a linear surface, or combinations thereof, between the root and crest portion of the thread form, whereby a distal portion of the three-dimensional stabilization thread has a greater dimension in a direction parallel to the longitudinal axis than a proximal portion of the three-dimensional stabilization thread;

wherein the first thread profile comprises a standard thread; and wherein the three-dimensional stabilization thread has a constant external diameter.

2. The dental implant of claim 1, further comprising at least one self-tapping cutting flute interrupting one or more portions of the external thread form wherein the cutting flute is configured to define a helical path or a linear path, or with multiple cutting flutes interrupting a plurality of portions of the external thread form, wherein the cutting flute is selected from the group consisting of an apical cutting flute, a lateral cutting flute, and any combination of both apical and lateral cutting flutes.

3. The dental implant of claim 1, wherein a larger shape or dimension, relative to a horizontal plane that is perpendicular to the longitudinal axis of the dental implant and passes through the crest portion of the thread, is present at a distal portion of the three-dimensional stabilization thread and a smaller shape or dimension, relative to a horizontal plane that is perpendicular to the longitudinal axis of the dental implant and passes through the crest portion of the thread, is present at a proximal portion of the three-dimensional stabilization thread.

4. The dental implant of claim 1, further comprising a crest relief feature formed at the crest portion of the three-dimensional thread, at least a portion of the crest relief feature being curved to define a non-linear and inwardly-recessed indent so as to lessen frictional engagement of the crest portion with a substance intended to receive the implant, wherein the crest portion proximal the distal portion of the three-dimensional thread form defines two generally outwardly-extending extensions comprising end surfaces, and wherein the crest relief feature is generally positioned between the extensions such that a discontinuous surface profile is provided from an end surface of one of the extensions, along the crest relief feature, and to the end surface of the other one of the extensions.

5. The dental implant of claim 4, further comprising one or more edges defined along the extensions and the crest relief feature of the three-dimensional stabilization thread, wherein the edges are substantially rounded by a particle blast process such that a substantially curved transition is provided along the profile of the three-dimensional stabilization thread, from the superior flank portion, along a first extension and the end surface thereof, along the crest relief feature, along a second extension and the end surface thereof, and to the inferior flank portion, particle blast process further providing at least a portion of the outer surface of the implant with a roughened surface such that the osseointegration of the dental implant to the surrounding bone is improved.

6. The dental implant of claim 1, further comprising a transition thread profile between the first thread profile and the second thread profile.

7. The dental implant of claim 1, wherein the standard thread of the second thread profile is selected from a v-thread profile or a buttress thread profile.

* * * * *